United States Patent
Gorbovitski et al.

(10) Patent No.: US 12,177,132 B1
(45) Date of Patent: Dec. 24, 2024

(54) L1 REPLICATOR AND SWITCH COMBINATION

(71) Applicant: Morgan Stanley Services Group Inc., New York, NY (US)

(72) Inventors: Michael Gorbovitski, New York, NY (US); Igor G. Muskatblit, Mountain View, CA (US); Joshua N. Elijah, London (GB); Holger Grund, London (GB)

(73) Assignee: Morgan Stanley Services Group Inc., New York, NY (US)

( * ) Notice: Subject to any disclaimer, the term of this patent is extended or adjusted under 35 U.S.C. 154(b) by 0 days.

(21) Appl. No.: 18/474,747

(22) Filed: Sep. 26, 2023

(51) Int. Cl.
*H04L 49/20* (2022.01)
*H04L 45/00* (2022.01)
*H04L 49/15* (2022.01)

(52) U.S. Cl.
CPC ............ *H04L 49/208* (2013.01); *H04L 45/66* (2013.01); *H04L 49/1576* (2013.01)

(58) Field of Classification Search
CPC .... H04L 49/208; H04L 45/66; H04L 49/1576
See application file for complete search history.

(56) References Cited

U.S. PATENT DOCUMENTS

| | | | |
|---|---|---|---|
| 5,577,204 A | 11/1996 | Brewer et al. | |
| 10,630,608 B2 * | 4/2020 | Snowdon | H04L 45/74591 |
| 10,708,127 B1 * | 7/2020 | Acharya | H04L 49/254 |
| 11,570,138 B2 * | 1/2023 | Goodwin | H04L 45/68 |
| 2014/0219650 A1 * | 8/2014 | Bruno | H04L 49/555 398/25 |
| 2017/0235695 A1 | 8/2017 | Blankenship et al. | |
| 2019/0095373 A1 * | 3/2019 | Manohar | G06F 13/4022 |
| 2022/0014483 A1 * | 1/2022 | Zhou | H04L 49/208 |
| 2022/0206849 A1 | 6/2022 | Guim Bernat et al. | |
| 2022/0232111 A1 | 7/2022 | Ford et al. | |
| 2023/0066682 A1 * | 3/2023 | Catalano | G06F 13/126 |

OTHER PUBLICATIONS

"Exablaze Introduces Ultra Low Latency Switch and Application Platform", retrieved from https://www.prnewswire.com/news-releases/exablaze-introduces-ultra-low-latency-switch-and-application-platform-281002252.html, dated Oct. 30, 2014.

* cited by examiner

*Primary Examiner* — Donald L Mills
(74) *Attorney, Agent, or Firm* — Leason Ellis LLP

(57) ABSTRACT

A data replication and switching device and method, including a plurality of data communication ports, a management port, at least one replicator respectively associated with the data communication port, a Layer 1 ("L1") switch, and a L1 bypass. At least some data received via the at least one of the plurality of ports can be routed to at least one of the plurality of data communication ports and, in response to the configuration data received via the at least one management port, the data replication and switching device can route at least some of the data received via the data communication port to bypass the L1 switch or to route at least some of the data received via the data communication port to the L1 switch.

19 Claims, 14 Drawing Sheets

L1 REPLICATOR AND SWITCH COMBINATION

FIELD

The present disclosure relates, generally, to data communication networking and, more particularly, to a system and method for providing latency reduction in high-speed data replication and switching applications.

BACKGROUND

Many networking applications include traffic mirroring functionality, for example, for data transmitted between two devices (e.g., a server computing device and a client computing device). Financial market applications often include traffic mirroring for a computing device configured for monitoring transmitted data, such as between a device configured for trading and a device configured for an exchange. Although implementing traffic mirroring, generally, is considered trivial to implement technically, there exists a tradeoff between ease of implementation and resulting latency.

Existing applications involving traffic mirroring can include use of one or more Layer 1 ("L1") switches, which can be configured to mirror data to one or more ports. Such functionality is typically configurable such that data sent/received via a port can be mirrored to other port(s) associated with the switch. While flexibility afforded by L1 switches is useful, in very low latency systems L1 switches can be unnecessary because the ports containing the mirrors are fixed, for example, due to cable length constraints. Moreover, such flexibility can add latency, which can be suboptimal particularly in ultra-low latency systems. For example, a L1 replication capability using an off-the-shelf L1 switch can add latency between 5-10 ns.

Alternatively, full traffic mirroring can be achieved by configuring, for example, the server computing device and/or the client computer to copy data internally and, thereafter, transmit the copied data via an unused port. While effective, this approach is usually not ideal, particularly if one of the devices on the network is a third-party device, such as the server computing device. In such case, a user may not have the ability to configure mirroring. Even if such configuring is possible, costs in terms of resources to allocate specific logic and port connections to achieve basic mirroring can be too high. This can be the case where field-programmable gate array ("FPGA") systems are used, whose resource utilization can approach 100%, particularly in applications that require significant memory usage.

Notwithstanding the above-identified traffic mirroring solutions, there remains a need for providing data mirroring functionality externally from the server or the client, without adding significant latency in the data path. It is with respect to these and other considerations that the disclosure made herein is presented.

SUMMARY

In one or more implementations of the present disclosure, a data replication and switching device and method are provided. A plurality of data communication ports can be provided, each configured to transmit and receive data to and from at least one computing device. A management port can be included with the data replication and switching device and configured to receive configuration data associated with operations of the data replication and switching device. In addition, at least one replicator respectively associated with the data communication port can be provided and configured to generate replicated data by replicating at least one of ingress data and egress data, and to route the replicated data to a replication port. A Layer 1 ("L1") switch can be provided with the data replication and switching device and configured to receive at least some data received via at least one of the plurality of data communication ports. A L1 bypass can be included with the data replication and switching device and configured to route at least some data received via the at least one of the plurality of ports to at least one of the plurality of data communication ports. In response to the configuration data received via the at least one management port, the data replication and switching device can route at least some of the data received via the data communication port to bypass the L1 switch or to route at least some of the data received via the data communication port to the L1 switch.

In one or more implementations of the present disclosure, the at least one replicator comprises a plurality of replicators, each of the plurality of replicators configured to route replicated data to a respective one of a plurality of replication ports.

In one or more implementations of the present disclosure, at least one of the plurality of replicators is configured to route replicated data to an ethernet port.

In one or more implementations of the present disclosure, at least one replicator is configured to route the replicated data to a fixed egress port.

In one or more implementations of the present disclosure, at least one replicator includes a silicon germanium fan-out chip.

In one or more implementations of the present disclosure, the L1 switch is configured to provide 1:n or n:1 mapping.

In one or more implementations of the present disclosure, the data replication and switching device can include a Layer 2 ("L2") switch that is configured to receive routed data, wherein the L2 switch is further configured to switch and route the routed data.

In one or more implementations of the present disclosure, the L2 switch is a field programmable gate array.

In one or more implementations of the present disclosure, the L1 switch is a crossbar switch.

Other features of the present disclosure are shown and described herein.

BRIEF DESCRIPTION OF THE DRAWINGS

Aspects of the present disclosure will be more readily appreciated upon review of the detailed description of its various embodiments, described below, when taken in conjunction with the accompanying drawings, of which.

DETAILED DESCRIPTION

Figure 1A:
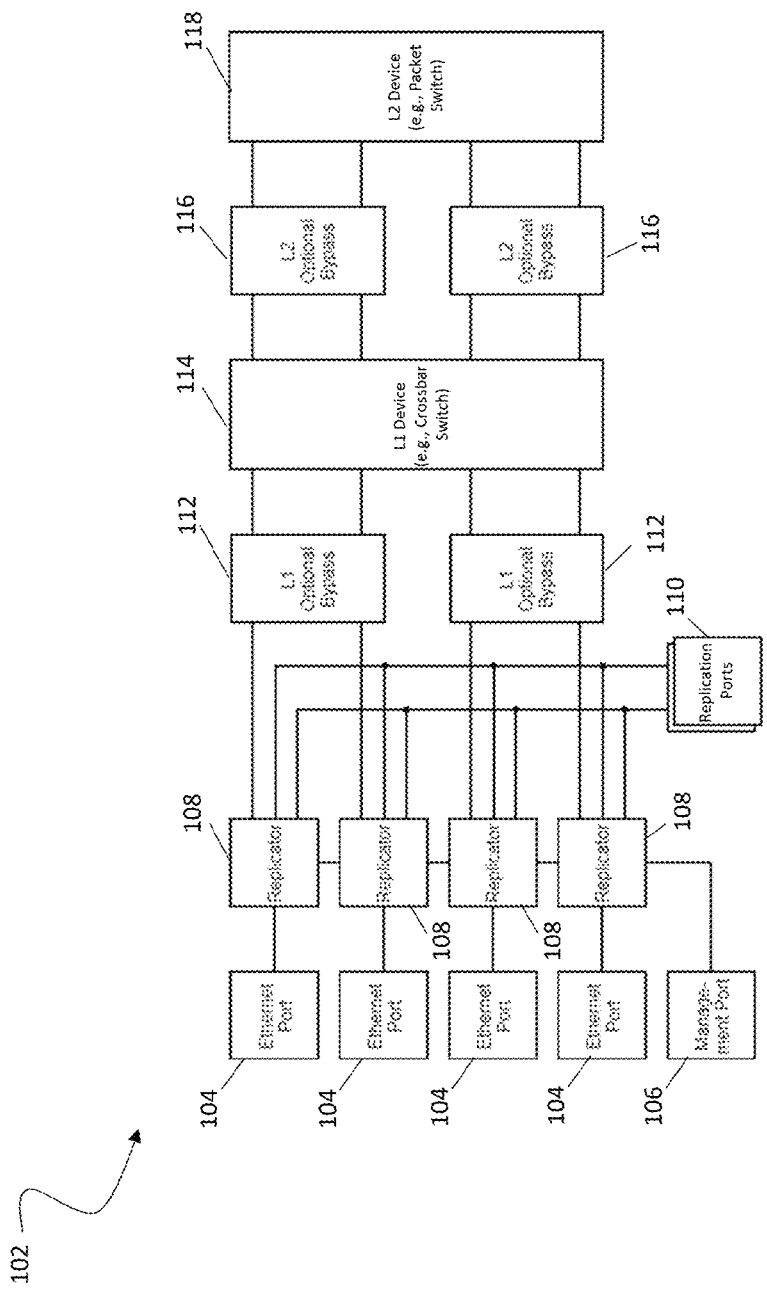
FIG. 1A is a simple circuit diagram illustrating a top-level view of a replicator/switch device, in accordance with an example implementation of the present disclosure.

By way of overview and introduction, the present disclosure provides systems and methods for, among other things, facilitating data traffic mirroring in networked applications with significantly reduced latency. In one or more implementations, data traffic mirroring is provided at least in part as a function of a replicator/switch device having at least one L1 switch, in which latency is optimized to below one nanosecond. Such a device can be applied to any application that requires negligible latency data mirroring capabilities, e.g. network monitoring, financial applications, or other applications.

In one or more implementations, a combination of a 10GBASE-KR layer 1 replicator and switch can be provided for sub-nanosecond data mirroring, thereby providing visibility of Ethernet traffic on a network more quickly than was previously possible using a traditional L1 switch, particularly for implementations where associated L1 switching functionality is not needed. Electrical replication circuitry can be placed "in front" of a L1 switch circuit, which can replicate and route data to fixed egress ports on a network device. This configuration provides for data replication in less than a nanosecond while still allowing L1 or L2 switching functionality. Moreover, the electrical replicator(s) can serve to disable port connectivity from an external power plane control device quickly and conveniently.

The present disclosure provides a layered approach of passing data through one or more electrical replicators for data mirroring on fixed paths in under one nanosecond. Data can, thereafter, be routed to a L1 switch (e.g., a cross-bar switch) that provides traditional 1:N or N:1 mapping of data between the ports, which generally incurs approximately 5 nanoseconds of latency. Further, data can be routed to a Layer 2 ("L2") capable device for automatic traffic switching and further routing, for example, based on the contents of the encoded Ethernet data. Such L2 capable device can be, for example, a FPGA, that typically incurs around 20 nanoseconds of latency.

In one or more implementations, the replication layer is located at or near the edge of the replicator/switch combination device shown and described herein, where the Ethernet data ingresses or egresses to and from the device, respectively. Electrical replicators can be placed both on the egress side (from the device to the network) and ingress side (from the network to the device), and both incoming and outgoing traffic can be copied immediately before entering or exiting the device. Replicated data can be routed directly to separate fixed ports on the device. This architecture enables specific functions for disabling traffic to be performed with minimal latency, including at the electrical level, which can be achieved through simple power control logic.

After the replication layer, ingress and egress data is routed to a L1 device, such as a crossbar switch. The crossbar switch performs the function of a L1 switch, thereby allowing data to be rerouted to any specific port based on a user's dynamic configuration. This behavior is akin to functioning of a standard L1 switch and provides full flexibility of front panel mapping.

In one or more implementations of the present disclosure, ultra-low latency may be required. In certain cases, such as where a fixed mapping with the lowest latency is used, the L1 switch can be bypassed dynamically. Moreover and as described herein, one or more implementations can include a L2 aware device as a final layer, which is configured to switch data based on its OSI model layer 2 contents. Such basic features can include the ability to aggregate (multiplex or "mux"), as well as to perform packet aware filtering and segregation in certain extended functionalities. The L2 device can be a FPGA, to reduce overall roundtrip latency. As described above in connection with a L1 device, in cases where extended functionality is not needed, the L2 device can be bypassed dynamically.

Referring to the drawings, in which like reference numerals refer to like or similar elements, FIG. 1A is a simple circuit diagram illustrating a top level view of a replicator/switch device 102 in accordance with an example implementation of the present disclosure. As illustrated in FIG. 1A, a plurality of Ethernet ports 104 are included for connectivity to and from one or more computing devices. In the device 102 implementation shown in FIG. 1A, replicators 108 are respectively coupled to Ethernet ports 104, as well as management port 106, and further coupled to replication ports 110. In addition, L1 optional bypass 112 is provided, as well as L1 device 114, L2 optional bypass 116 and L2 device 118, as described herein.

Figure 1B:
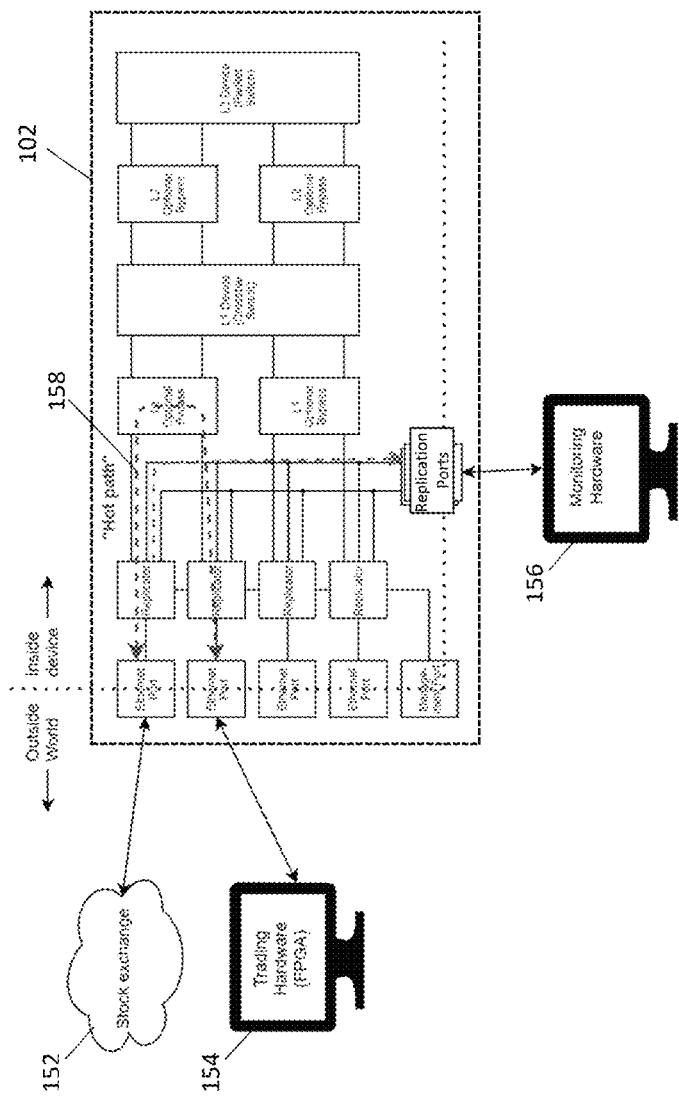
FIG. 1B is a simple circuit diagram including replicator/switch device in the context of an application involving financial trading.

FIG. 1B is a simple circuit diagram including replicator/switch device 102 in the context of an application involving financial trading. Two of the respective Ethernet ports 104 are illustrated in FIG. 1B as being in use, including by a computing device associated with an outside network (e.g., a stock exchange 152) and a computing device associated with a client (e.g., trading hardware 154 comprising a FPGA). In the example illustrated in FIG. 1B, monitoring hardware 156 is shown, which accesses mirrored data provided via replication ports 110. In the example shown in FIG. 1B, the optional L1 bypass 112 is used to forward data to and from trading hardware 152 and stock exchange 154. It is recognized herein that voluminous traffic being routed to and from respective Ethernet ports, particularly in instances when the L1 optional bypass is used as shown in FIG. 1B, can result in significant increase in heat. Referred to herein, generally, as a "hot path" 158, in one or more implementations and as shown in FIGS. 1A and 1B, replication ports 110 are positioned physically away from replicators 108 and Ethernet ports 104 (i.e. away from "hot path" 158), to reduce a likelihood of additional heat buildup and performance degradation (e.g., increased latency). Accordingly, by providing a relatively long pathway from hot path 158, a form of latency "steering" or gating is provided.

Figure 2A:
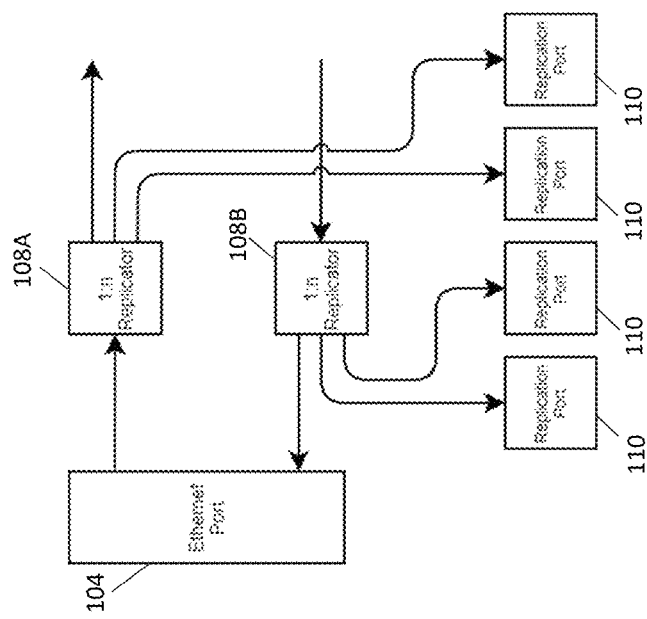
FIGS. 2A and 2B illustrate operation of a replication structure for a single Ethernet port including two distinct channels (egress (tx) an ingress (rx)), in accordance with an example implementation of the present disclosure.
Figure 2B:
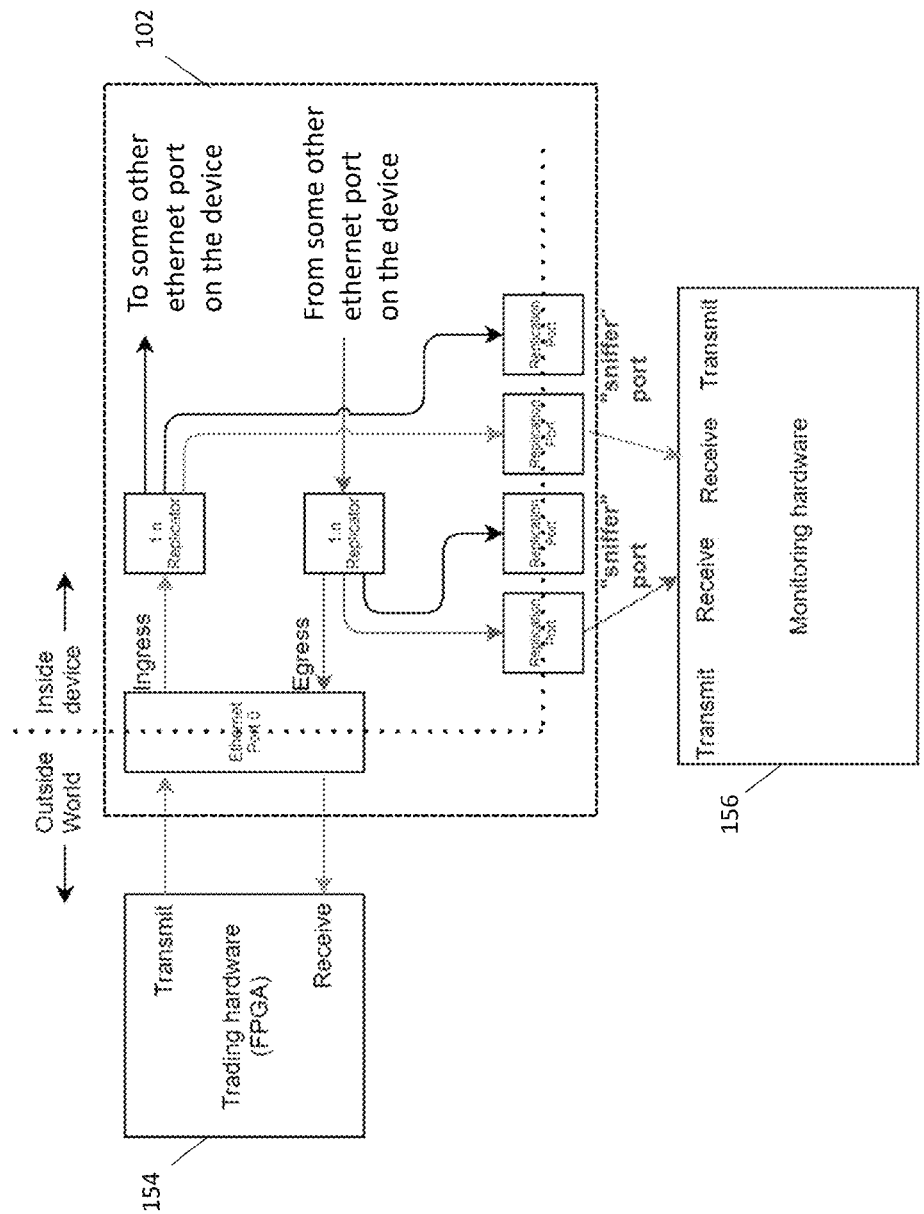

Operation of a replication structure for a single Ethernet port including two distinct channels (egress (tx) an ingress (rx)) is further described with reference to an example replicator/switch device 102 and illustrated in FIGS. 2A and 2B. As illustrated in FIGS. 2A and 2B, two 1:n replicators 204A and 204B are included, which can be any electrical circuit capable of copying a signal n-times. In one or more implementations, a simple fan-out chip is a suitable choice for inclusion in replicator 204 (including 204A and 204B). As noted herein, the present disclosure can regard a 10GBASE-KR Ethernet configuration, and a fan-out chip can be configured to include silicon germanium (SiGe) or other suitable non-standard silicon substrate capable of handling signals with fundamental frequencies achieving 10 Gbps. In one or more implementations, a SiGe fan-out chip is preferable due to its ability to achieve lower latency than other substrates, including for having a propagation delay of only around 90 picoseconds.

Continuing with reference to FIGS. 2A and 2B, replication can be achieved without interrupting the downstream data path (both ingress and egress data pathways) by passing through a first copy of data. In the case of egress data, signals from inside device 102 pass through a respective replicator 108, and a first copy is passed from the replicator 108 to a respective Ethernet port 104, for connection to one or more external network devices. In the case of ingress data, signals from outside device 102 pass through a respective replicator 108, and the first copy from the replicator is passed further into the device. Accordingly, one of ordinary skill will recognize that the ingress and egress pair is essentially unaffected by addition of these replicators, other than a relatively minor increase in symmetrical latency.

Continuing with reference to FIGS. 2A and 2B, remaining data copies from both replicators (108A and 108B) are routed to fixed replication ports 110 on the device 102. Although copies (or mirrors) of both the ingress and egress data with respect to the device, from the standpoint of replication, the copies are effectively outputs and, thus, to be treated as unidirectional egress data channels. In other words, when routed to fixed replication ports 110, only the egress side of the port of replicator 108 (e.g., 108A and/or 108B) is used. This enables the replication ports 108 to be externally connected to other components in device 102, thereby providing visibility of all ingress and egress traffic from device 102 (e.g., functioning as "sniffer ports") to any other external device, without incurring any meaningful increase in latency on the original Ethernet signal.

Figure 3:
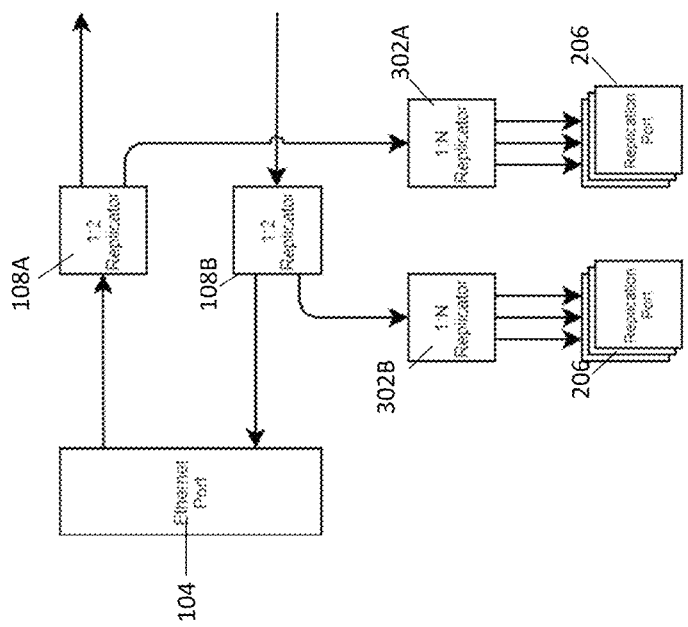
FIG. 3 illustrates a replication structure of a single ethernet port having a plurality of replicators, in accordance with an example implementation of the present disclosure.

It is to be appreciated that the physical layout and location of components in device 102, including replicators 108, is impactful for reducing the possibility of incurring latency. The particular configuration illustrated, for example, in FIGS. 1A-2B represents a particular implementation, although different electrical layouts are envisioned and supported in connection with the teachings herein, including that may result in reducing path length. These may include, for example, splitting replication between two fan-out chips. For example, a respective 1:2 fan-out chip in replicator 108A is provided initially to provide the passthrough signal (e.g., to L1 device 114) and a respective copy signal. The copy signal can be passed through to a respective 1:N fan-out chip (e.g., replicator 302A), thereby providing a desired number of copies of the signal at some distance from the passthrough signal. Similarly, a respective a respective 1:2 fan-out chip in replicator 108B is provided initially to provide the passthrough signal (e.g., to Ethernet port 104) and a respective copy signal. The copy signal can be passed through to a respective 1:N fan-out chip (e.g., replicator 302B), again thereby providing a desired number of copies of the signal at some distance from the passthrough signal. An example implementation showing this approach is illustrated in FIG. 3.

Figure 4:
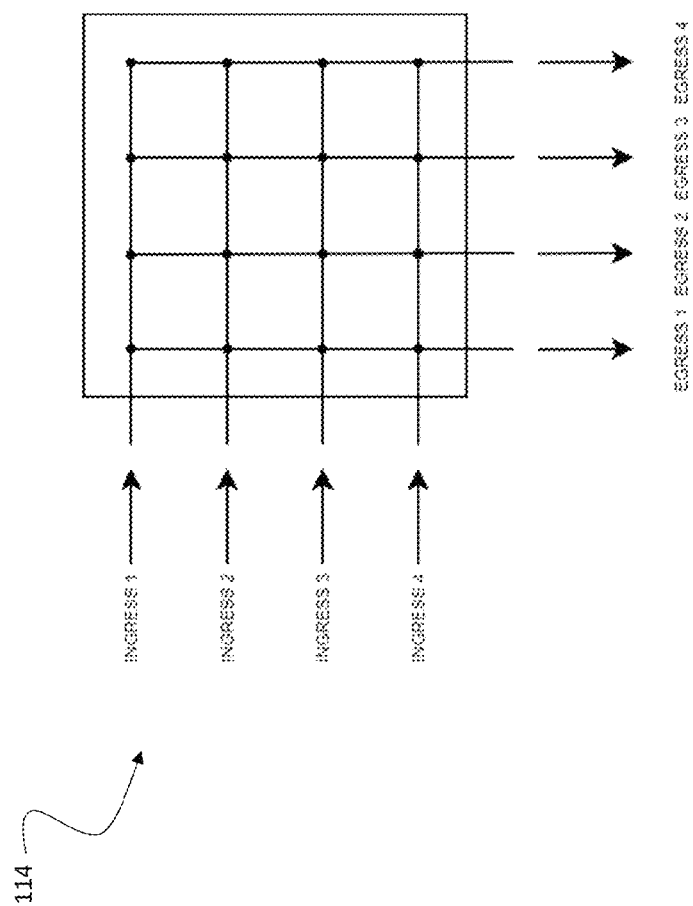
FIG. 4 is a diagram of an example L1 device, which is formed of an N-channel crossbar switch.

Turning now to FIG. 4, an example L1 device 114 is illustrated, which is formed of an N-channel crossbar switch. During operation of replicator/switch device 102, once the ingress and egress signal pair has passed through the replication structure (e.g., replicator 108), the signal can be passed to L1 switch device 114. In one or more implementations, the signal pair can pass by way of L1 optional bypass 112, as shown and described herein. The layer 1 switch device can allow for a dynamic assignment of different port pairings, for example, based on a user's preference. Use of an N-channel crossbar switch for such a circuit element, as shown in FIG. 4, is likely to introduce a 5 to 10 nanosecond increase in latency.

Continuing with reference to FIG. 4, each Ethernet port operates on an ingress and egress signal. Accordingly, and as illustrated in FIG. 4, a corresponding input and output is used on the crossbar switch of L1 device 114 is used per port. In accordance with one or more implementations, the physical distance between the ingress and egress signal is kept to a minimum to prevent introducing additional path length. The selection of a crossbar switch that places input and output ports adjacent to each other on the chip is made to address this concern, as well as to yield a benefit in reducing latency. In addition to the example illustrated in FIG. 4, other variants of a crossbar switch, such as in a ball grid array (BGA) having input and output pins located physically close to each other, are available and envisioned within the scope of the present disclosure.

Figure 5A:
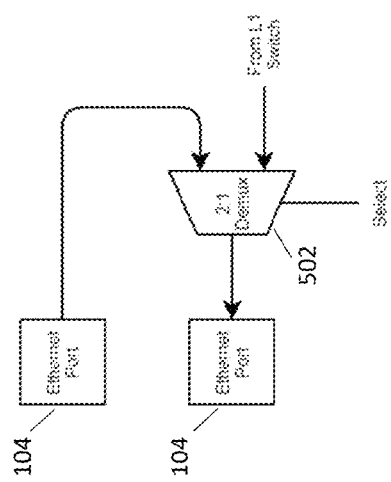
FIG. 5A illustrates an implementation of a switch device, showing a single data path channel between two Ethernet ports.

It is recognized by the inventors that including a L1 device provides significant flexibility to device 102, despite additional latency that can be incurred. Accordingly and, for example, in fixed port mapping applications, one or more implementations of device 102 can include an L1 optional bypass 112 device to reduce latency. The basic building block of the bypass circuitry is the 1:2 mux/demux 502 that is usable to perform either multiplexor or de-multiplexor operations. FIG. 5A illustrates an implementation of a replicator/switch device 102, showing a single data path channel between two Ethernet ports. In operation, the value of the select pin identifies whether the egress signal originates from another port's ingress and bypassing the L1 or from the L1 switch. Such an approach is realized with known circuit components, typically only adding around 80 picoseconds in latency.

Figure 5B:
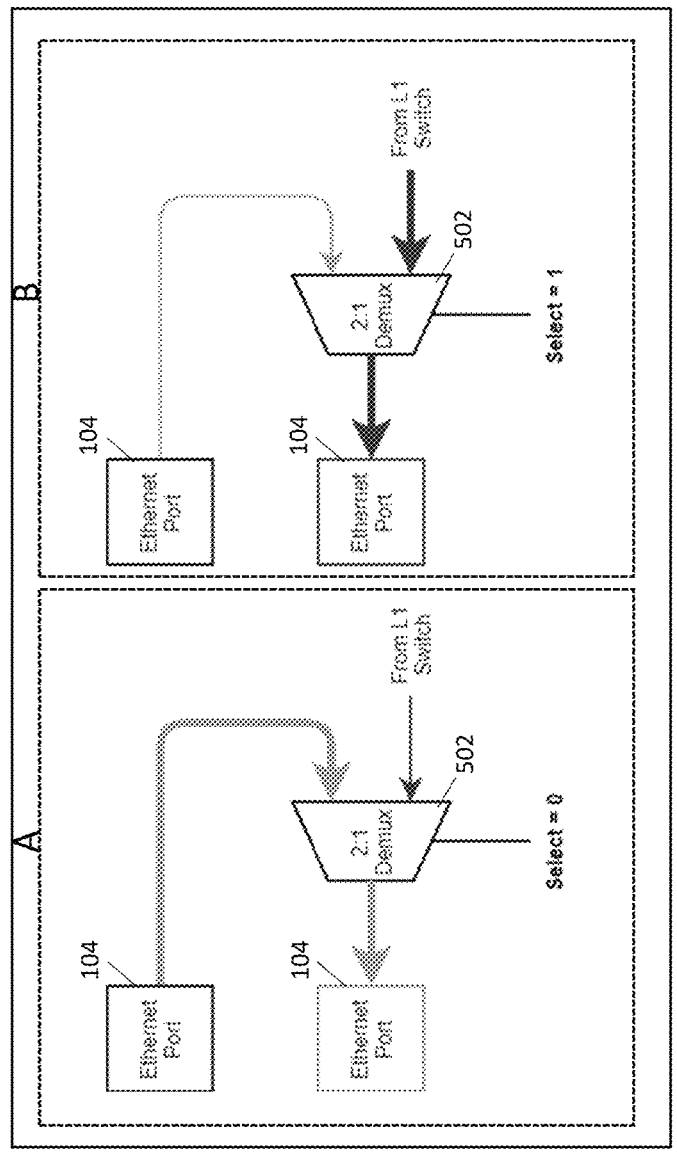
FIG. 5B illustrates two respective operations (A and B) for data path channels in accordance with the implementation illustrated in FIG. 5A.

FIG. 5B illustrates two respective operations (A and B) for data path channels in accordance with the implementation illustrated in FIG. 5A. Under example operation A, the value of the select pin identifies the egress signal originating from another port's 104 ingress and bypassing the L1 device 114. Under operation B, the value of the select pin identifies the egress signal originating from the L1 device 114.

Figure 6A:
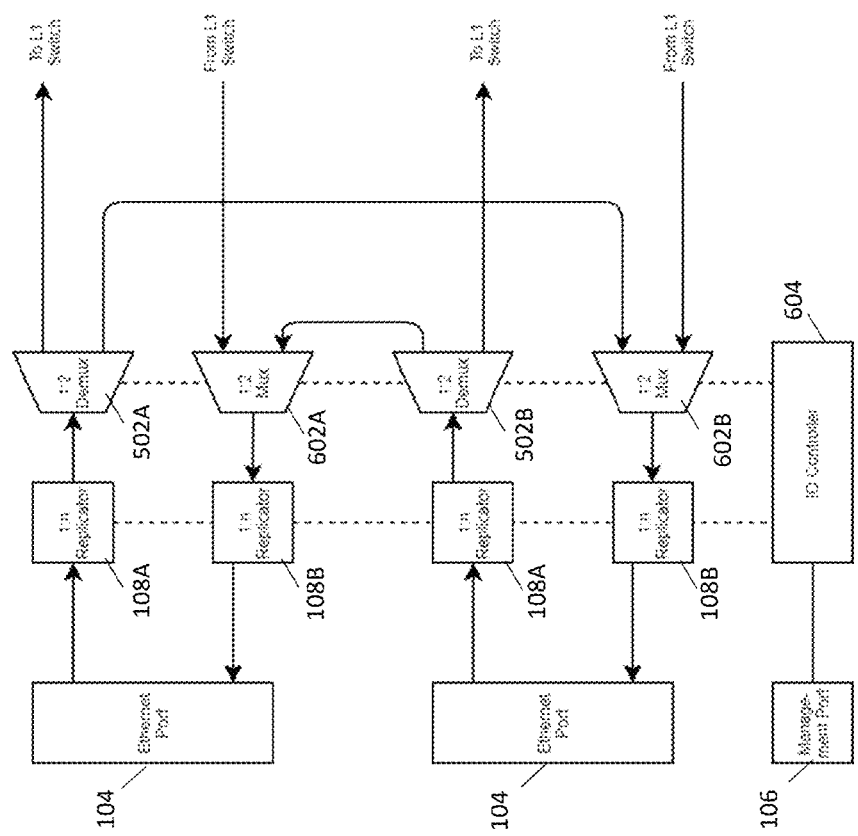
FIGS. 6A and 6B illustrate operations including respective data path channels of an implementation of a replicator/switch device, in accordance with an example implementation of the present disclosure.
Figure 6B:
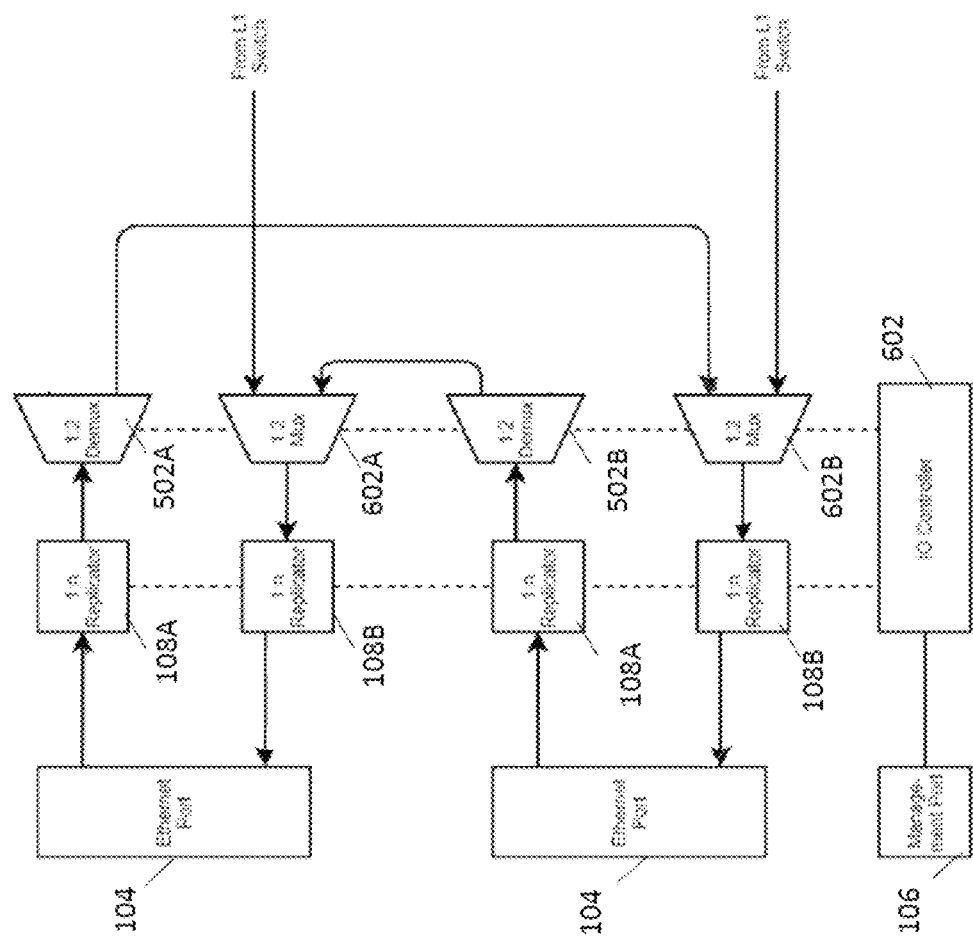
Figure 6C:
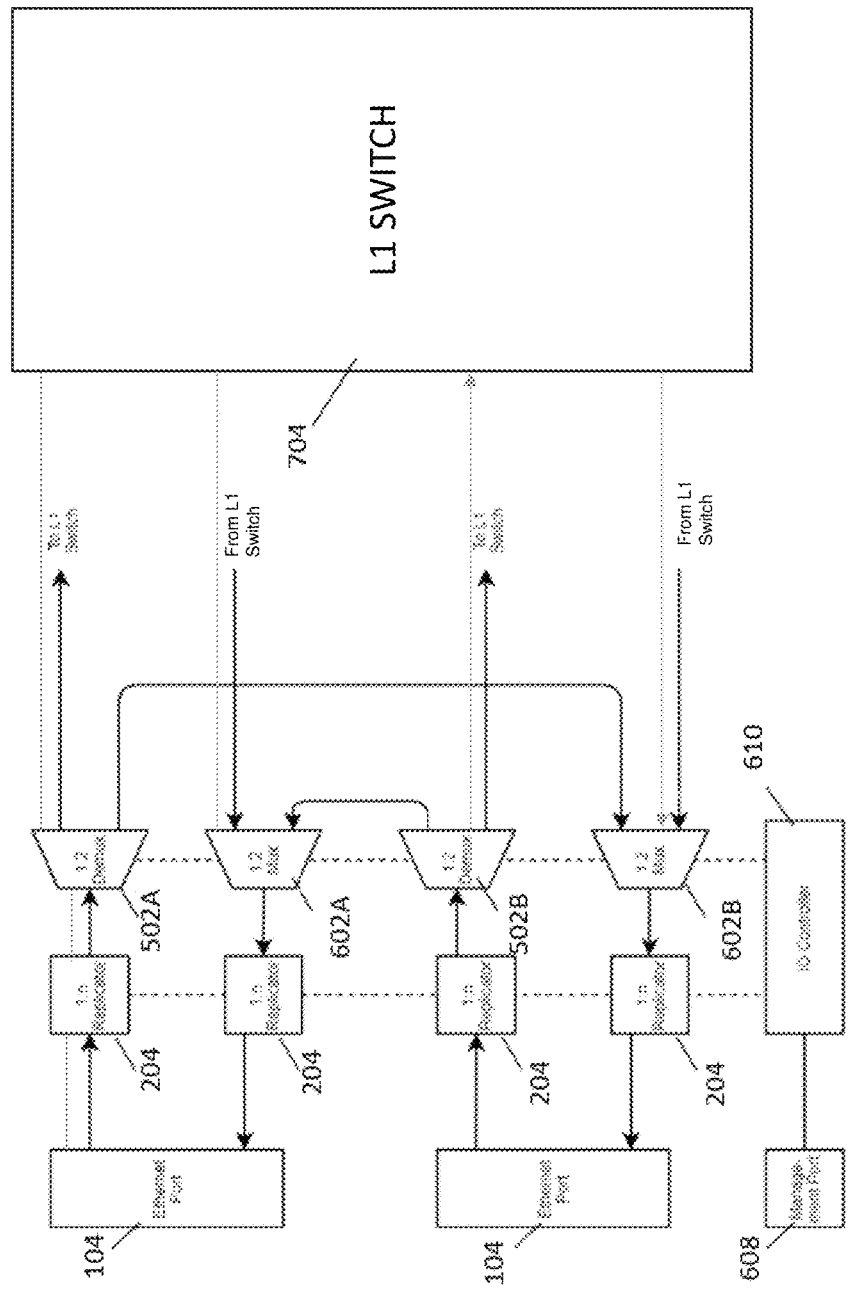
FIG. 6C illustrates signal routing L1 optional bypass disabled.

FIGS. 6A and 6B illustrate operations including respective data path channels of an implementation of a replicator/switch device 102 in accordance with an example implementation of the present disclosure. In the examples shown in FIGS. 5A and 5B, only a single egress port is shown, however the approach shown and described herein can be extended to both the ingress and egress sides of a port, which is shown in FIGS. 6A and 6B. FIG. 6A illustrates a mux/demux structure that can select between either direct patching between two ports (L1 optional bypass 112) or not. The replication ports are omitted for brevity. In operation, data from the top Ethernet port's 104 ingress passes through the replicator 108A, and then to the 1:2 demux 502A, which selects whether the signal is passed to the L1 switch, or passed to the 1:2 mux 602B of the bottom Ethernet port. The control logic of all muxes 602 can be set up so that all muxes 602 switch to either the L1 device 114 or to L1 bypass device 112, and can be coordinated by an onboard IO processor (e.g., IO controller 602). For example, the processor can receive data from an external management port 106, thereby allowing external configuration of L1 bypass functionality shown and described herein. In the example shown in FIG. 6A, the muxes 602 are switched to the L1 bypass device 112 and the data path channels are represented, accordingly. The example in 6B illustrates signal routing with L1 optional bypass 112 enabled. In the example shown in FIG. 6B, the muxes 602 are switched to the L1 device 114 and the data path channels are represented. In the example shown in FIG. 6C, signal routing is shown with L1 optional bypass 112 disabled. The L1 device 114 allows any generic routing to be achieved, thus the signal paths are not fixed.

In the approach described here, each mux 602/demux 502 pair behaves as a double pole double throw ("DPDT") switch. A need for a second mux 602A or 602B may seem unnecessary, as muxing on the egress side can be achieved by simply connecting two signals to the same wire. However this assumes that (a) the L1 device 114 outputs in high impedance in the case where L1 optional bypass 112 is selected and (b) the signal being switched is not an RF signal. Given that this replicator/switch device 102 is configured to be usable with 10Gb Ethernet, it would not be acceptable to connect two signals to the same wire as this would form a stub on the unused wire, greatly diminishing signal integrity.

Accordingly, optimization can be provided by use of (a) Ethernet being a differential signal (i.e. data are transmitted on a pair of conductors, with one conductor carrying the signal and the other, its inverse) and (b) the short path lengths in this system allow for the differential signals to be broken up into two single ended signals without significant signal degradation. Thus, a negated copy of the signal can be obtained without any incurred latency. This negated signal can then be applied to the negative input of any circuit element and behaves exactly as a positive single ended or differential signal. The compromise of this approach is that extra demands are put on physical layout (particularly symmetry), and also a common mode bias is applied to the unused input on any device.

Figure 7:
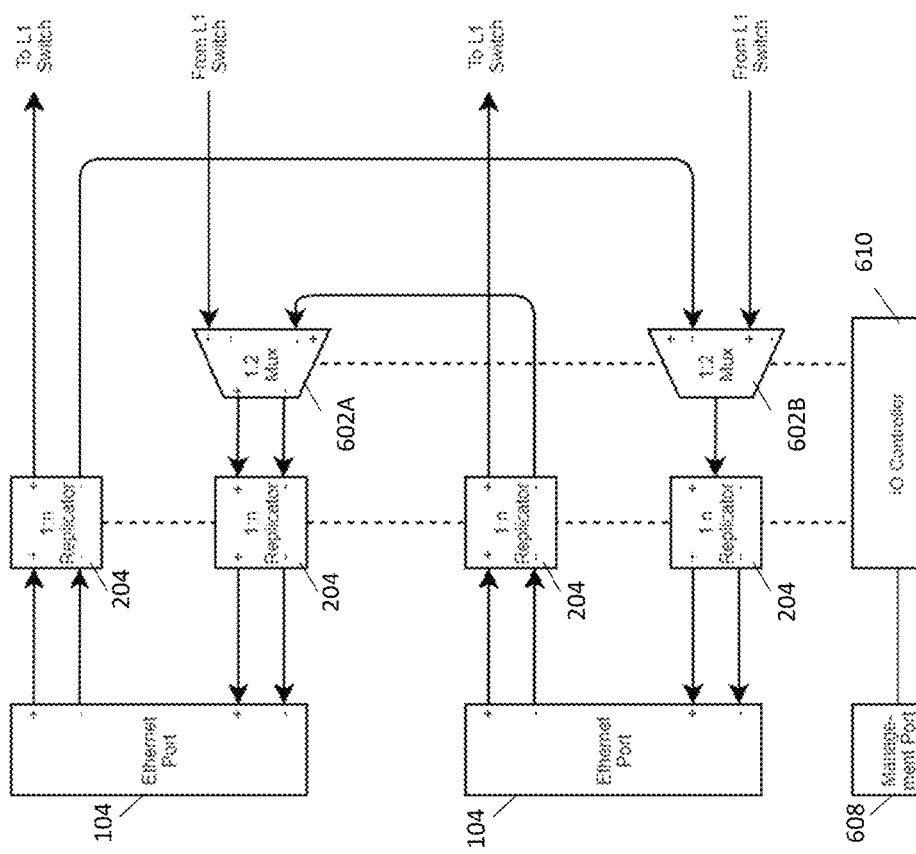
FIG. 7 illustrates an implementation of the present disclosure in which 1:2 demux is removed.

FIG. 7 illustrates an implementation of the present disclosure in which 1:2 demux 502 is removed. In cases of selectively routing one signal input to one of two outputs, a 1:2 demux 502 can be used. In an non-optimized example, only one spare replication port was available and the 1:2 demux 502 is usable for selectively routing. In the example shown in FIG. 7, however, an optimization can be made by using a differential signal as two single-ended signals, thereby supporting routing both single-ended signals to an egress of the 2:1 mux control 602. In this example, one of the unused single-end signals is terminated by either the L1 device 114 or the mux 602.

While the optimized implementation shown in FIG. 7 may seem unnecessary, the space and cost savings cost increase as number of ports on the device increase. The optimized implementation frees up valuable space and thermal dissipation on the board, such that circuit elements can be more closely placed together while simultaneously reducing latency. Generation of a bias voltage applied to unconnected inputs (not shown) is relatively trivial and can be achieved by way of a low-dropout regulator or other suitable voltage reference generator. In operation, the latency of the layer 1 bypass circuitry represented in the example illustrated in FIG. 7 is around 400 picoseconds when accounting for the path lengths. When combined with the replication circuit latency (estimated around 300 picoseconds), the total path delay on the board for simple fixed layer 1 replication and bypass is less than 1 nanosecond.

Referring back to FIG. 1A, L2 device 118, for example, can be a packet switch, and provides replicator/switch device 102 with more capable packet switching functions, akin to a traditional L2 routing device. Interconnection of previous layers can provide full channel mapping capability and low latency replication. The specific implementation use for this L2 device 118 can include a FPGA with inbuilt transceivers, thereby providing custom functionality. Externalizing aspects of the transceivers for faster packet analysis is also supported, and increased latency due to the L2 device 118 can depend on a specific FPGA configuration, although not expected to be below 25 nanoseconds.

Furthermore and with continued reference to FIG. 1A, certain applications require only L1 capabilities. In one or more implementations, one or more bypass structures (e.g., L2 optional bypass 116) can be included for bypassing the L2 device 118. In such applications, a L1 switch+replication is provided and having an estimated latency of approximately 5-10 nanoseconds.

Figure 8:
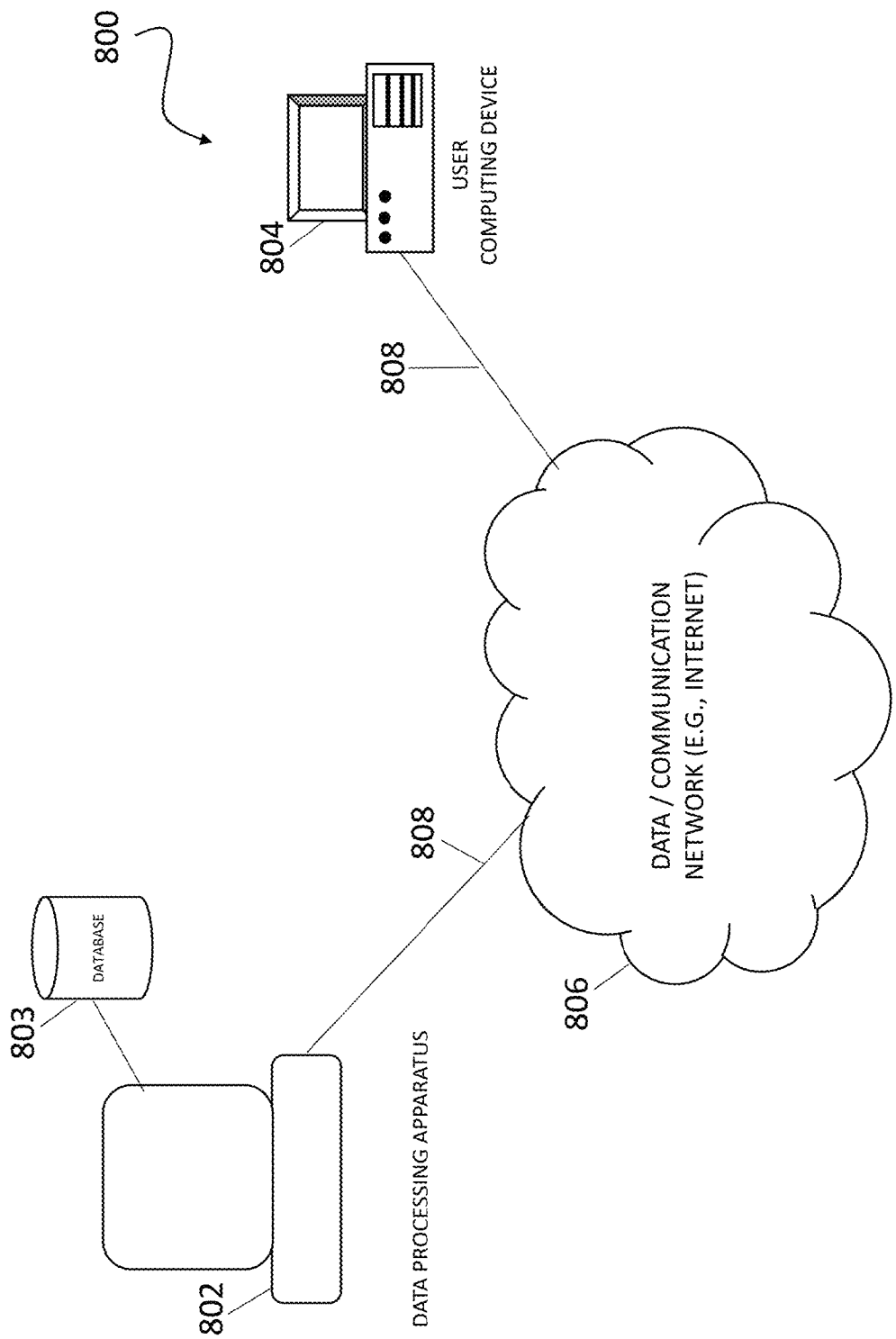
FIG. 8 is a diagram showing an example hardware arrangement that can be configured for providing the systems and methods disclosed herein.

Referring to FIG. 8, a diagram is provided that shows an example hardware arrangement that is configured for providing the systems and methods disclosed herein and designated generally as system 800. System 800 can include one or more information processors 802 that are at least communicatively coupled to one or more user computing devices 804 across communication network 806. Information processors 802 and user computing devices 804 can include, for example, mobile computing devices such as tablet computing devices, smartphones, personal digital assistants or the like, as well as laptop computers and/or desktop computers, server computers and mainframe computers. Further, one computing device may be configured as an information processor 802 and a user computing device 804, depending upon operations being executed at a particular time.

With continued reference to FIG. 8, information processor 802 can be configured to access one or more databases 803 for the present disclosure, including source code repositories and other information. However, it is contemplated that information processor 802 can access any required databases via communication network 806 or any other communication network to which information processor 802 has access. Information processor 802 can communicate with devices comprising databases using any known communication method, including a direct serial, parallel, universal serial bus ("USB") interface, or via a local or wide area network.

User computing devices 804 can communicate with information processors 802 using data connections 808, which are respectively coupled to communication network 806. Communication network 806 can be any data communication network. Data connections 808 can be any known arrangement for accessing communication network 806, such as the public internet, private Internet (e.g., VPN), dedicated Internet connection, or dial-up serial line interface protocol/point-to-point protocol (SLIPP/PPP), integrated services digital network (ISDN), dedicated leased-line service, broadband (cable) access, frame relay, digital subscriber line (DSL), asynchronous transfer mode (ATM) or other access techniques.

User computing devices 804 preferably have the ability to send and receive data across communication network 806, and are equipped with web browsers, software disclosures, or other means, to provide received data on display devices incorporated therewith. By way of example, user computing device 804 may be personal computers such as Intel Pentium-class and Intel Core-class computers or Apple Macintosh computers, tablets, smartphones, but are not limited to such computers. Other computing devices which can communicate over a global computer network such as palmtop computers, personal digital assistants (PDAs) and mass-marketed Internet access devices such as WebTV can be used. In addition, the hardware arrangement of the present invention is not limited to devices that are physically wired to communication network 806, and that wireless communication can be provided between wireless devices and information processors 802.

System 800 preferably includes software that provides functionality described in greater detail herein, and preferably resides on one or more information processors 802 and/or user computing devices 804. One of the functions performed by information processor 802 is that of operating as a web server and/or a web site host. Information processors 802 typically communicate with communication network 806 across a permanent (i.e. un-switched) data connection 808. Permanent connectivity ensures that access to information processors 802 is always available.

Figure 9:
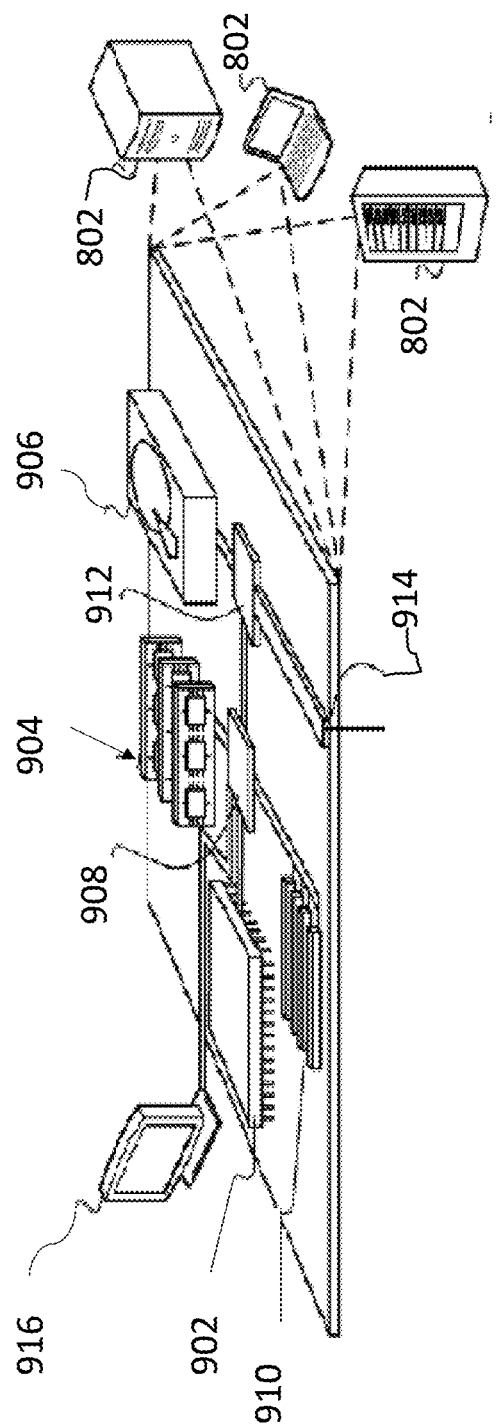
FIG. 9 shows an example information processor and/or user computing device.

FIG. 9 shows an example information processor 802 and/or user computing device 804 that can be used to implement the techniques described herein. The information processor 802 and/or user computing device 804 is intended to represent various forms of digital computers, such as laptops, desktops, workstations, personal digital assistants, servers, blade servers, mainframes, and other appropriate computers. The components shown in FIG. 9, including connections and relationships, and their functions, are meant to be exemplary only, and are not meant to limit implementations of the inventions described and/or claimed in this document.

As shown in FIG. 9, the information processor 802 and/or user computing device 804 includes a processor 902, a memory 904, a storage device 906, a high-speed interface 908 connecting to the memory 904 and multiple high-speed expansion ports 910, and a low-speed interface 912 connecting to a low-speed expansion port 914 and the storage device 906. Each of the processor 902, the memory 904, the storage device 906, the high-speed interface 908, the high-speed expansion ports 910, and the low-speed interface 912, are interconnected using various busses, and can be mounted on a common motherboard or in other manners as appropriate. The processor 902 can process instructions for execution within the information processor 802 and/or user computing device 804, including instructions stored in the memory 904 or on the storage device 906 to display graphical information for a GUI on an external input/output device, such as a display 916 coupled to the high-speed interface 908. In other implementations, multiple processors and/or multiple buses can be used, as appropriate, along with multiple memories and types of memory. Also, multiple computing devices can be connected, with each device providing portions of the necessary operations (e.g., as a server bank, a group of blade servers, or a multi-processor system).

The memory 904 stores information within the information processor 802 and/or user computing device 804. In some implementations, the memory 904 is a volatile memory unit or units. In some implementations, the memory 904 is a non-volatile memory unit or units. The memory 904 can also be another form of computer-readable medium, such as a magnetic or optical disk.

The storage device 906 is capable of providing mass storage for the information processor 802 and/or user computing device 804. In some implementations, the storage device 906 can be or contain a computer-readable medium, e.g., a computer-readable storage medium such as a floppy disk device, a hard disk device, an optical disk device, or a tape device, a flash memory or other similar solid-state memory device, or an array of devices, including devices in a storage area network or other configurations. A computer program product can also be tangibly embodied in an information carrier. The computer program product can also contain instructions that, when executed, perform one or more methods, such as those described above. The computer program product can also be tangibly embodied in a computer- or machine-readable medium, such as the memory 904, the storage device 906, or memory on the processor 902.

The high-speed interface 908 can be configured to manage bandwidth-intensive operations, while the low-speed interface 912 can be configured to manage lower bandwidth-intensive operations. Of course, one of ordinary skill in the art will recognize that such allocation of functions is exemplary only. In some implementations, the high-speed interface 908 is coupled to the memory 904, the display 916 (e.g., through a graphics processor or accelerator), and to the high-speed expansion ports 910, which can accept various expansion cards (not shown). In an implementation, the low-speed interface 912 is coupled to the storage device 906 and the low-speed expansion port 914. The low-speed expansion port 914, which can include various communication ports (e.g., USB, Bluetooth, Ethernet, wireless Ethernet) can be coupled to one or more input/output devices, such as a keyboard, a pointing device, a scanner, or a networking device such as a switch or router, e.g., through a network adapter. Accordingly, the automated methods described herein can be implemented by in various forms, including an electronic circuit configured (e.g., by code, such as programmed, by custom logic, as in configurable logic gates, or the like) to carry out steps of a method. Moreover, steps can be performed on or using programmed logic, such as custom or preprogrammed control logic devices, circuits, or processors. Examples include a programmable logic circuit (PLC), computer, software, or other circuit (e.g., ASIC, FPGA) configured by code or logic to carry out their assigned task. The devices, circuits, or processors can also be, for example, dedicated or shared hardware devices (such as laptops, single board computers (SBCs), workstations, tablets, smartphones, part of a server, or dedicated hardware circuits, as in FPGAs or ASICs, or the like), or computer servers, or a portion of a server or computer system. The devices, circuits, or processors can include a non-transitory computer readable medium (CRM, such as read-only memory (ROM), flash drive, or disk drive) storing instructions that, when executed on one or more processors, cause these methods to be carried out.

Accordingly, as shown and described herein, respective configurations in a replicator/switch device 102 are provided that include full traffic mirroring in an ethernet network with significant reduction in latency. In one or more implementations, a combined approach to achieving L1 and L2 switching and respective bypassing is supported, which can include fast path replication for lowest latency monitoring. Further, latency steering or gating can be provided as a function of respective physical distances of components set forth in a replicator/switch device 102. For example, by positioning replicating components away from the hot path, additional heat and corresponding latency can be avoided. Still further, implementations are supported herein in which a sort of free replicator can be realized as a function of otherwise unused negative signal of a circuit element, applied as an input to a 1:2 mux 602.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises" and/or "comprising," when used in this disclosure, specify the presence of stated features, integers, steps, operations, elements, and/or components, but do not preclude the presence or addition of one or more other features, integers, steps, operations, elements, components, and/or groups thereof.

It should be noted that use of ordinal terms such as "first," "second," "third," etc., in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

Also, the phraseology and terminology used herein is for the purpose of description and should not be regarded as limiting. The use of "including," "comprising," or "having," "containing," "involving," and variations thereof herein, is meant to encompass the items listed thereafter and equivalents thereof as well as additional items.

What is claimed is:

1. A data replication and switching device, comprising:
   a plurality of data communication ports, each configured to transmit and receive data to and from at least one computing device;
   at least one electrical replicator configured to receive and replicate the data received from respective ones of the plurality of data communication ports;
   a Layer 1 ("L1") switch configured to receive some of the data from the at least one electrical replicator;
   a management port configured to receive configuration data associated with operations of the data replication and switching device; and
   a L1 bypass configured to route some of the data received from the at least one electrical replicator directly to at least one of the plurality of data communication ports, thereby bypassing the L1 switch,
   wherein the at least one electrical replicator is located in front of the L1 switch, and further wherein the at least one electrical replicator is configured to route the replicated data to at least one of a replication port and the L1 switch, and
   further wherein, in response to the configuration data received via the at least one management port, the data replication and switching device is configured to route some of the data received from the at least one electrical replicator to bypass the L1 switch via the L1 bypass and to route some of the data received from the at least one electrical replicator to the L1 switch, wherein the some of the data routed to bypass the L1 switch is not received by the L1 switch.

2. The device of claim 1, wherein the at least one electrical replicator comprises a plurality of replicators, each of the plurality of replicators configured to route replicated data to a respective one of a plurality of replication ports.

3. The device of claim 2, wherein at least one of the plurality of electrical replicators is configured to route replicated data to an ethernet port.

4. The device of claim 1, wherein the at least one electrical replicator is configured to route the replicated data to a fixed egress port.

5. The device of claim 1, wherein the at least one electrical replicator includes a silicon germanium fan-out chip.

6. The device of claim 1, wherein the L1 switch is configured to provide 1:n or n:1 mapping.

7. The device of claim 1, further comprising a Layer 2 ("L2") switch configured to receive routed data, wherein the L2 switch is further configured to switch and route the routed data.

8. The device of claim 7, wherein the L2 switch is a field programmable gate array.

9. The device of claim 1, wherein the L1 switch is a crossbar switch.

10. A data replication and switching method, comprising:
    receiving data, via each of a plurality of data communication ports configured with a data replication and switching device, from at least one computing device;
    receiving, via a management port configured with the data replication and switching device, configuration data associated with operations of the data replication and switching device;
    replicating, by at least one electrical replicator respectively associated with at least one of the data communication ports, at least one of ingress data and egress data;
    routing, by the at least one electrical replicator, the replicated data to a replication port configured with the data replication and switching device;
    receiving, via a Layer 1 ("L1") switch configured with the data replication and switching device, some data from the at least one electrical replicator; and
    routing, by the data replication and switching device in response to the configuration data received via the at least one management port, some of the data from the at least one electrical replicator to bypass the L1 switch and to route some of the data from the electrical replicator to the L1 switch, wherein the some of the data routed to bypass the L1 switch is not received by the L1 switch.

11. The method of claim 1, wherein at least some of the data received from the at least one electrical replicator is routed to at least one replication port located physically away from the at least one electrical replicator.

12. The method of claim 1, wherein the at least one electrical replicator comprises a plurality of electrical replicators, and further comprising:
    routing, by each of the plurality of electrical replicators, replicated data to a respective one of a plurality of replication ports.

13. The method of claim 12, further comprising:
    routing, by at least one of the plurality of electrical replicators, replicated data to an ethernet port.

14. The method of claim 10, further comprising routing, by at least one electrical replicator, the replicated data to a fixed egress port.

15. The method of claim 10, wherein at least one electrical replicator includes a silicon germanium fan-out chip.

16. The method of claim 10, further comprising providing, by L1 switch, 1:n or n:1 mapping.

17. The method of claim 10, further comprising:
    receiving, by a Layer 2 ("L2") switch, routed data; and
    switching and routing the routed data.

18. The method of claim 17, wherein the L2 switch is a field programmable gate array.

19. The method of claim 10, wherein the L1 switch is a crossbar switch.

\* \* \* \* \*